A. P. PFEIL.

BREAD BAKING SHELL.

APPLICATION FILED DEC. 31, 1918.

Reissued Nov. 25, 1919.

14,761.

WITNESS:

Wm. Bell.

INVENTOR,

Anthony P. Pfeil,

BY

John Ruwald

ATTORNEY.

UNITED STATES PATENT OFFICE.

ANTHONY P. PFEIL, OF EAST ORANGE, NEW JERSEY, ASSIGNOR TO ERNST F. W. WIEDA, OF PATERSON, NEW JERSEY.

BREAD-BAKING SHELL.

14,761. Specification of Reissued Letters Patent. Reissued Nov. 25, 1919.

Original No. 1,263,103, dated April 16, 1918, Serial No. 72,327, filed January 15, 1916. Application for reissue filed December 31, 1918. Serial No. 269,142.

*To all whom it may concern:*

Be it known that I, ANTHONY P. PFEIL, a citizen of the United States, residing at East Orange, in the county of Essex and State of New Jersey, have invented certain new and useful Improvements in Bread-Baking Shells, of which the following is a specification.

The object of this invention is to provide a baking shell which may possess certain advantages affecting the baking process that characterize the baking shell disclosed in my application for U. S. Letters Patent Serial Number 46,228, filed August 19, 1915, and at the same time be considerably less expensive to manufacture and more substantial and durable in construction, as well as light in weight.

In the accompanying drawings.

The shell is composed of a rectangular piece *a* of sheet metal which is formed foraminous, having preferably very fine holes *b*, throughout substantially the whole area thereof.

Figure 1:
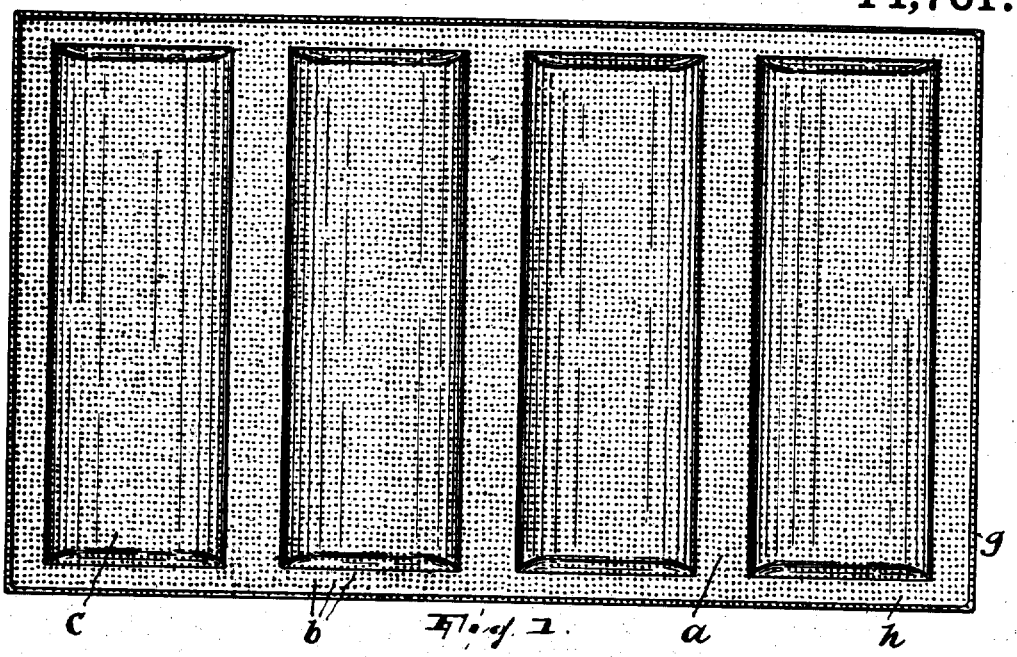
Figure 1 is a plan view of the improved baking shell.
Figure 2:
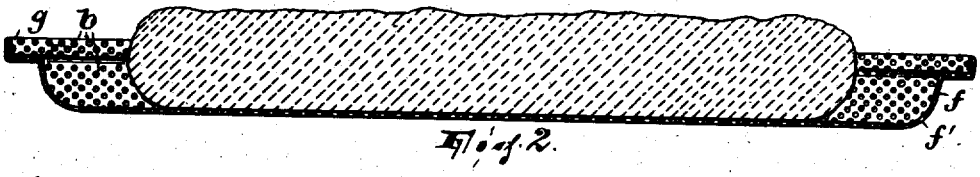
Fig. 2 is a sectional view taken longitudinally of one of the depressions, showing a piece of dough to form the loaf in place in the depression.
Figure 3:
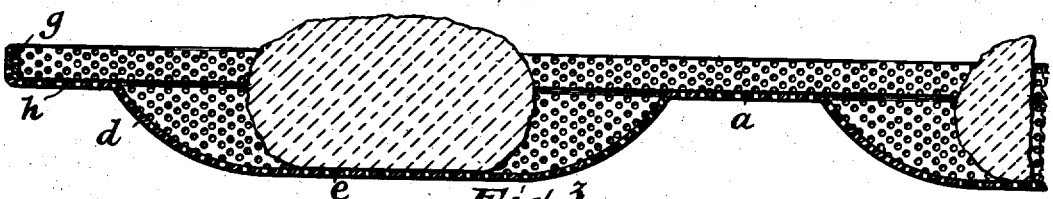
Fig. 3 is a sectional view on a larger scale of one end portion of the shell, taken transversely of its depressions, and also showing a piece of dough in place.

At suitable intervals elongated depressions *c* are formed in said piece side by side and preferably parallel with each other, the side margins *d*, at least, of each depression rising gradually from its bottom *e*; as for the end margins *f* of each depression, if the depressions are made suitably longer than the piece of dough to be baked, they may rise more precipitously from the bottom *e*, but in any event it is preferable that they form with the bottom rounded corners *f'*, Fig. 2.

The several edges of the sheet metal piece *a* are bent back upon themselves in the form of layers bearing flatwise against each other, as at *g*, and the thus rebent portions are bent up so as to form an upstanding wall, as shown. To make this wall continuous, the thus rebent edges may be welded together at their ends. All around the group of depressions there is left a plain or flat portion *h* of the sheet which, with the continuous double-thickness upstanding wall already described, constitutes a cross-sectionally angular marginal reinforce on the shell, which not only affords a suitable rim but strengthens the shell (which would otherwise be flimsy and of insufficient strength to resist the handling incident to its use on account of the numerous perforations therein) without adding materially to the weight thereof.

The present baking shell possesses all the advantages of that set forth in my application referred to in that it affords a utensil in which the pieces of dough to be formed can be placed in a group and thereupon handled as a group in the transfer from the forming table to the curing shelves and from the latter to the hearth and in which the baking of the particular kind of bread for which it is intended (full-crust bread, like Vienna and French loaves and rolls, etc.) can be accomplished with the same result as to form of the baked loaves and uniformity and extensiveness of crust, as in bread baked directly on the hearth; that is to say, being foraminous throughout, the heat from the hearth directly reaches all parts of the loaf which adjoin the shell, so that it becomes crusted as to the surface next to the shell the same as it does at its exposed surface, while the gradual elevation of the side margins of each depression deflects upwardly and gives the outlying side portions of the loaf as it expands laterally the "start" to rise that I have found is indispensable if, in place of baking directly on the hearth, a utensil is used.

Figure 4:
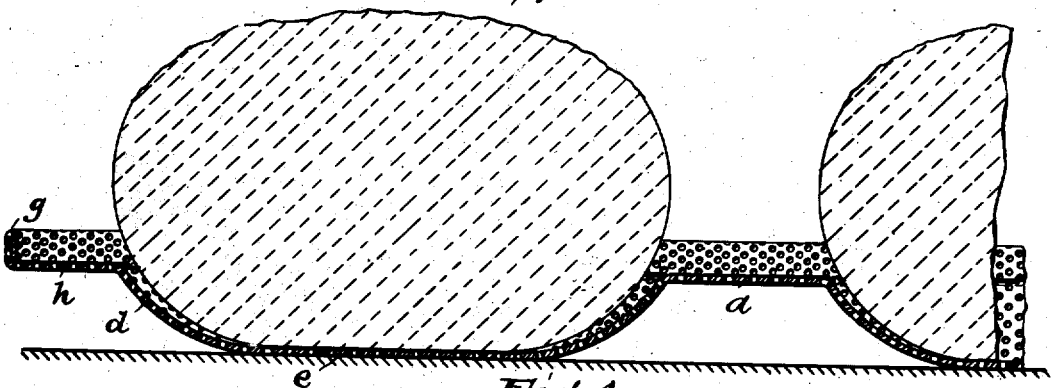
Fig. 4 is a view similar to Fig. 3, showing the baked loaf, Fig. 5 showing a detail.
Figure 5:
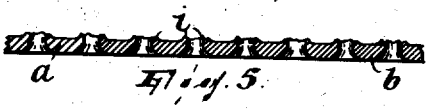

It will be seen that in Fig. 4 the curved sides of the baked loaf are clear of the upwardly curved side margin of the depression. In the process of baking the loaf shown the same expanded laterally till it encountered the upward curvature of the side margins and then drew upwardly away from them as the crust formed and hardened. This desired rise of the sides of the loaf occurs in baking directly on the hearth, which is perfectly flat, but it will not ensue where a utensil is interposed—certainly with the regularity which commercial baking requires—even if a shell otherwise the same as my shell is used, unless the side margins of the baking-contact surface are gradually inclined. (By "baking-contact surface" I mean so much of the surface of the shell as the loaf actually comes in contact with from start to finish of the baking process). Gradual elevation of the end margins of the depression is not indispensable because it is enough at the ends of the loaf if the start to rise is prompted by the side margins. Said surface of the shell should be without angles not only to avoid giving an angular shape to the under side of the loaf, not characteristic of Vienna or full-crust bread, but because if such angle marks the line where the margin of the shell begins to incline the loaf will not in baking spring up from the margin but will adhere thereto so that it will be pan-shaped on the bottom and also pan-marked—that is, the bottom crust will be paler and otherwise distinct from the top crust, after the manner of ordinary pan-baked bread.

The improved shell is stronger and at the same time much lighter than my previous construction.

The rounding of the corners *f'* at the ends of the depressions has for its purpose to facilitate the baker's peel being introduced under the shell.

As before stated, the perforations *b* are very fine and close together. They are moreover formed by punching the sheet from the side which is to be the outside of the shell. This leaves a bur *i* on the inside at each hole, the effect of which is to make the loaf simulate the rougher appearance at the under side of the loaf which any hearth-baked loaf has in comparison with a pan-baked loaf; in addition, the loaf when baked is cleaner at the under side because the burs form with the loaf a seal which prevents the draft through the holes from drawing up burnt particles of flour dust and other matter that acts to soil the loaf.

Having thus fully described my invention, what I claim as new and desire to secure by Letters Patent is:—

1. A baking shell consisting of a piece of sheet metal having one or more baking depressions therein and flanking said depression or depressions on all sides thereof, a continuous marginal cross-sectionally angular reinforcing portion having one wall thereof substantially horizontal and the other wall upstanding, said shell being foraminous throughout substantially the whole of the area of each depression.

2. A baking shell consisting of a piece of sheet metal having one or more baking depressions therein and flanking said depression or depressions on all sides thereof a continuous marginal cross-sectionally angular reinforcing portion having one wall thereof substantially horizontal and the other wall upstanding, said shell being foraminous throughout substantially the whole of the area thereof surrounded by said portion.

3. A baking shell consisting of a piece of sheet metal having one or more baking depressions therein and flanking said depression or depressions on all sides thereof a continuous marginal cross-sectionally angular reinforcing portion having one wall thereof substantially horizontal and the other wall upstanding and formed by bending the edge of the piece back on itself in the form of layers bearing flatwise against each other, said shell being foraminous throughout substantially the whole of the area of each depression.

4. A sheet metal plate for use in baking material of the kind herein described formed without angles as to its baking-contact surface and having numerous closely arranged minute perforations arranged throughout all of an area somewhat greater than and including that on which the body of material to be baked initially rests in direct contact.

5. A sheet metal plate for use in baking material of the kind herein described having numerous closely arranged minute perforations arranged throughout all of an area somewhat greater than and including that on which the body of material to be baked initially rests in direct contact, the part of said plate forming the marginal part of the first-named area rising gradually and without the formation of an angle.

In testimony whereof, I affix my signature.

ANTHONY P. PFEIL.